US009027940B2

(12) United States Patent
Ergun et al.

(10) Patent No.: US 9,027,940 B2
(45) Date of Patent: May 12, 2015

(54) WORK SURFACE OPENING MECHANISM (71) Applicant: Ergotron, Inc., Eagan, MN (US)

(72) Inventors: Mustafa A. Ergun, Plymouth, MN (US); Robert W. Fluhrer, Prior Lake, MN (US); Tony Peng, Shuang Long Town (CN)

(73) Assignee: Ergotron, Inc., St. Paul, MN (US)

(*) Notice: Subject to any disclaimer, the term of this patent is extended or adjusted under 35 U.S.C. 154(b) by 0 days.

(21) Appl. No.: 14/037,605

(22) Filed: Sep. 26, 2013

(65) Prior Publication Data

US 2014/0084558 A1    Mar. 27, 2014

Related U.S. Application Data (60) Provisional application No. 61/705,797, filed on Sep. 26, 2012.

(51) Int. Cl.
*B62B 1/08* (2006.01)
*B62B 3/00* (2006.01)
*A47B 21/03* (2006.01)
*A47B 31/00* (2006.01)
*A47B 41/02* (2006.01)

(52) U.S. Cl.
CPC ............ *B62B 3/005* (2013.01); *A47B 21/0314* (2013.01); *A47B 31/00* (2013.01); *A47B 41/02* (2013.01); *A47B 2200/0023* (2013.01); *B62B 2202/56* (2013.01)

(58) Field of Classification Search
USPC ............. 280/47.35, 47.315, 651, 79.11, 79.7; 108/25, 50.02, 50.01, 26; 312/223.3, 312/196, 21–30, 208.1
See application file for complete search history.

(56) References Cited

U.S. PATENT DOCUMENTS

| 993,588 | A | * | 5/1911 | Donning | 312/26 |
| 2,746,829 | A | | 5/1956 | Spillane | |
| 8,250,993 | B2 | * | 8/2012 | Griepentrog et al. | 108/25 |
| 2009/0315287 | A1 | | 12/2009 | Rossini | |
| 2012/0236496 | A1 | * | 9/2012 | McRorie | 361/679.55 |

FOREIGN PATENT DOCUMENTS

| FR | 30846 E | 10/1926 |
| WO | WO-2009076738 A1 | 6/2009 |
| WO | WO-2014052575 A1 | 4/2014 |

OTHER PUBLICATIONS

"International Application Serial No. PCT/US2013/061901, International Search Report mailed Jan. 3, 2014", 4 pgs.
"International Application Serial No. PCT/US2013/061901, Written Opinion mailed Jan. 3, 2014".

* cited by examiner

*Primary Examiner* — John Walters
*Assistant Examiner* — James Triggs
(74) *Attorney, Agent, or Firm* — Schwegman Lundberg & Woessner, P.A.

(57) ABSTRACT

A cart comprising a base, and a work station supported by the base. The work station including a compartment, a work surface disposed above the compartment, and an opening mechanism. The work surface moveable between an open position to provide access to the compartment and a closed position to deny access to the compartment. The work station including a first opening mechanism adapted to concurrently translate and rotate the work surface. Methods of using such carts.

29 Claims, 11 Drawing Sheets

WORK SURFACE OPENING MECHANISM

RELATED APPLICATIONS

This application claims priority to U.S. Provisional Application Ser. No. 61/705,797, filed Sep. 26, 2012, the contents of which are hereby incorporated by reference.

FIELD

This disclosure generally relates to system and methods for opening a compartment in a cart.

BACKGROUND

Computer carts, charging carts and the like can include a compartment for supporting and/or charging electronic devices and a work surface. An electronic device, such as a central processing unit (CPU) of a desktop computer, a notebook computer, a tablet computer and similar devices can often be stored and/or charged in this compartment. An electronic display can be supported above the work surface.

SUMMARY

Embodiments of the invention include a cart. Such carts can be useful for storing and/or charging one or more electronic devices such as a desktop computer, a notebook computer, a tablet computer, a smartphone and similar devices. The cart can include a base and a work station supported by the base. The work station can include a compartment, a work surface disposed above the compartment, and an opening mechanism to facilitate opening and closing the work surface to access the compartment. The work surface can be moveable between an open position to provide access to the compartment and a closed position to deny access to the compartment. The work surface can include a first edge and a second edge. The opening mechanism can be adapted to concurrently translate and rotate the work surface such that the second edge of the work surface pivots about a pivot axis, the second edge translates in a generally horizontal plane, and the first edge of the work surface moves in an arcuate path, with the center of the arcuate path pivoted about the second edge.

Embodiments of the invention also include an opening mechanism comprising a compartment enclosed by a generally planar work surface, a first hinge, a second hinge, a third hinge and a linkage bar rotatably coupled to the compartment and the work surface by at least one of the first hinge and the second hinge. At least one of the first hinge and second hinge can be adapted to rotatably move the work surface, and the third hinge can be adapted to concurrently slidably move the work surface. Embodiments of the invention also include methods of using such carts and opening mechanisms.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
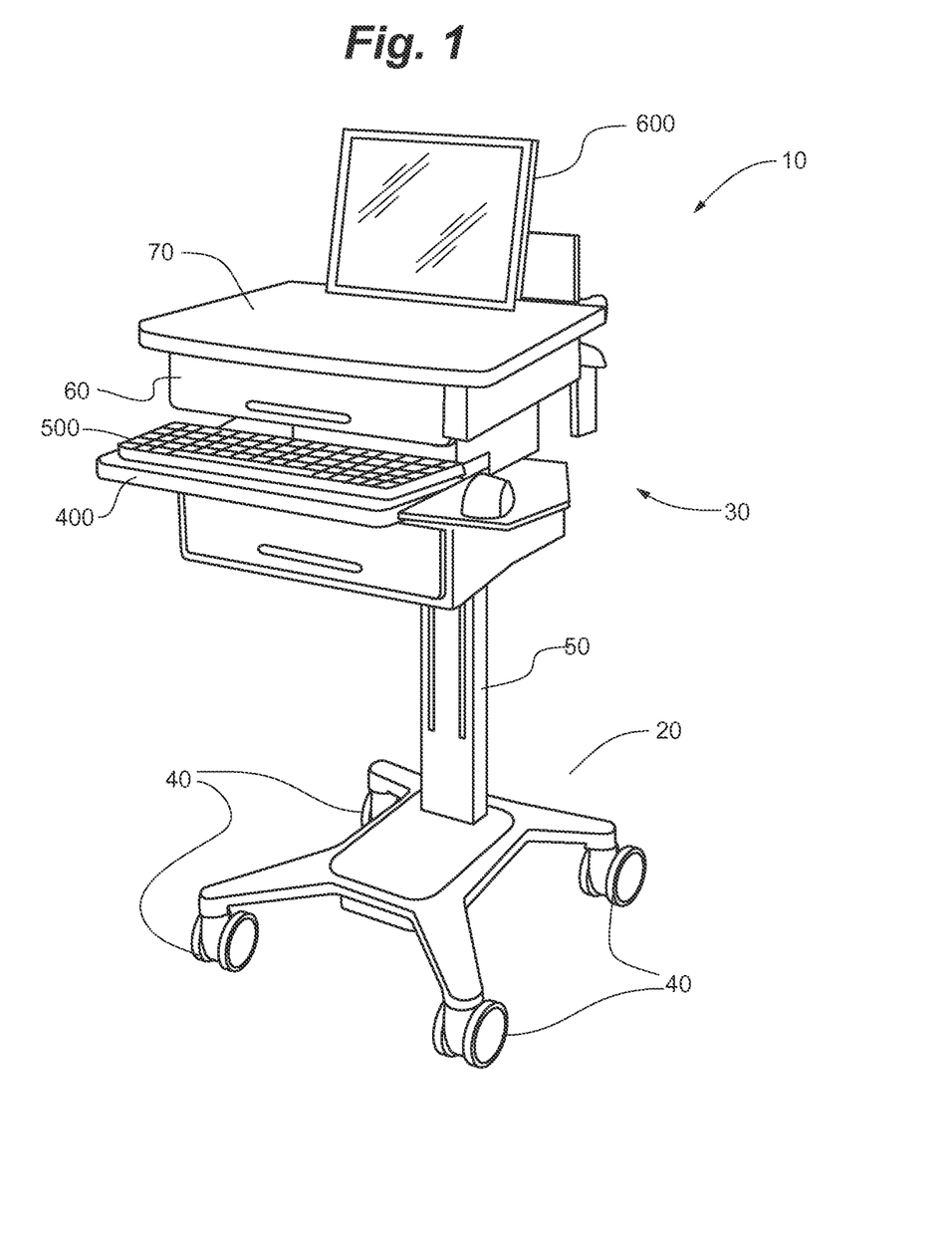
FIG. 1 is a perspective view of an embodiment of a cart comprising a compartment with a work surface in a closed position.
Figure 2:
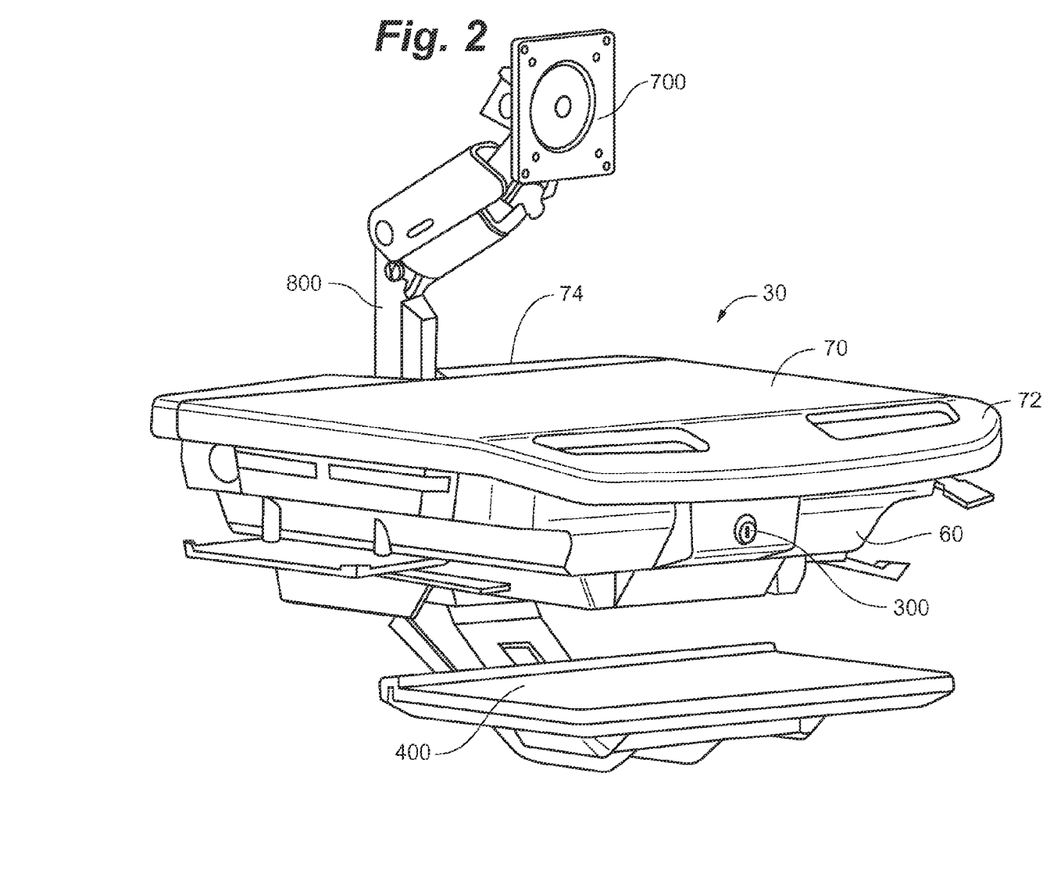
FIG. 2 is a close-up perspective view of a top portion of a cart with the work surface in a closed position.

Embodiments of the invention include a cart 10 (e.g., a computing cart and/or charging cart). An exemplary embodiment is shown in FIGS. 1-2. Such carts can be useful for storing and/or charging one or more electronic devices such as a desktop computer, a notebook computer, a tablet computer, a smartphone and similar devices (each of which is referred to herein as "an electronic device"). The cart 10 can include a base 20 and a work station 30 supported by the base 20. In some embodiments, the cart can include a plurality of casters 40 supported by the base 20. The casters 40 can be useful for moving and positioning the cart at different locations. The work station 30 can be supported by a riser 50 extending vertically from the base 20. The work station 30 can be height adjustable with respect to the base 20.

Figure 3A:
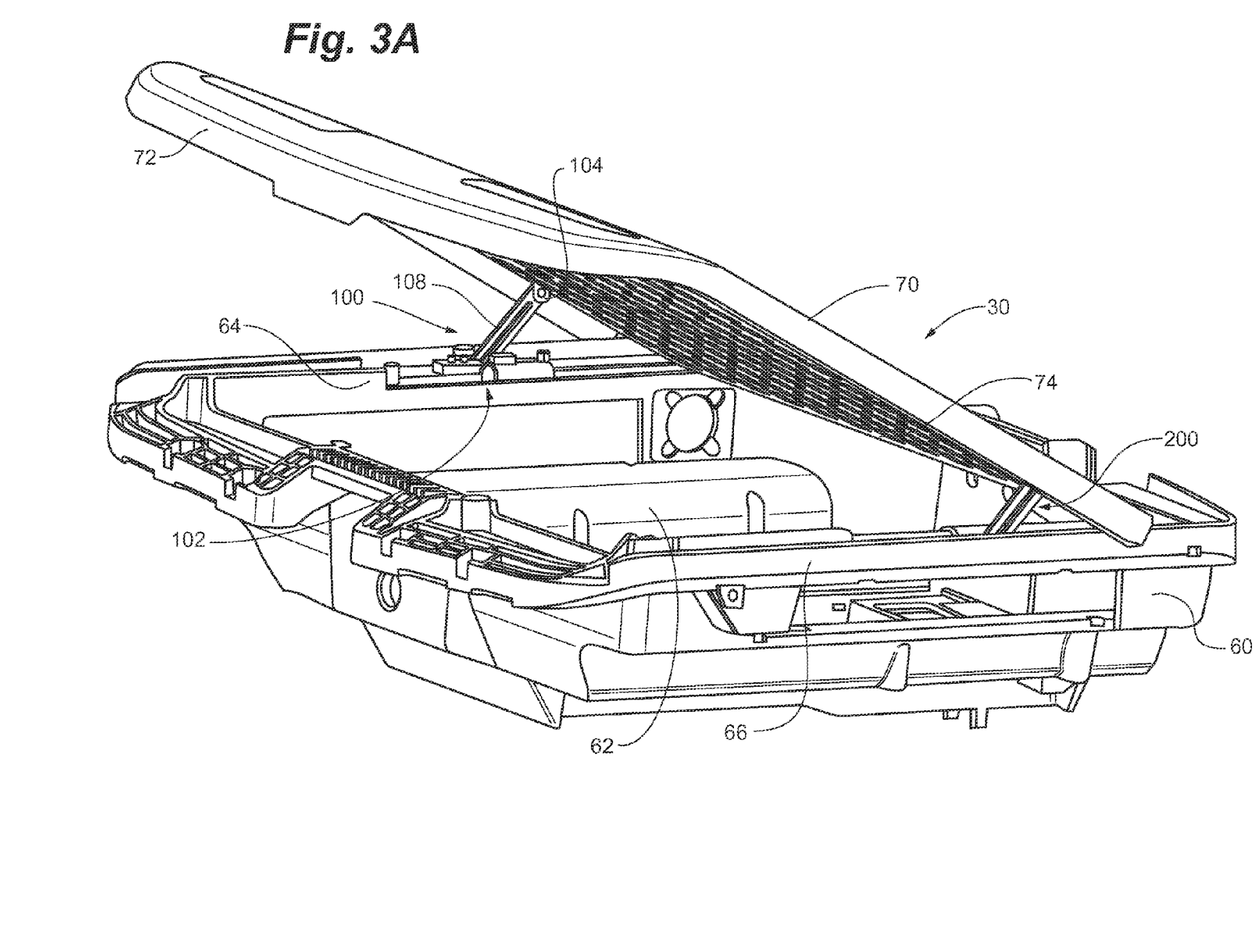
FIG. 3A is a perspective view of an embodiment of an opening mechanism for a cart with the work surface in a partially open position over an exposed compartment.
Figure 3B:
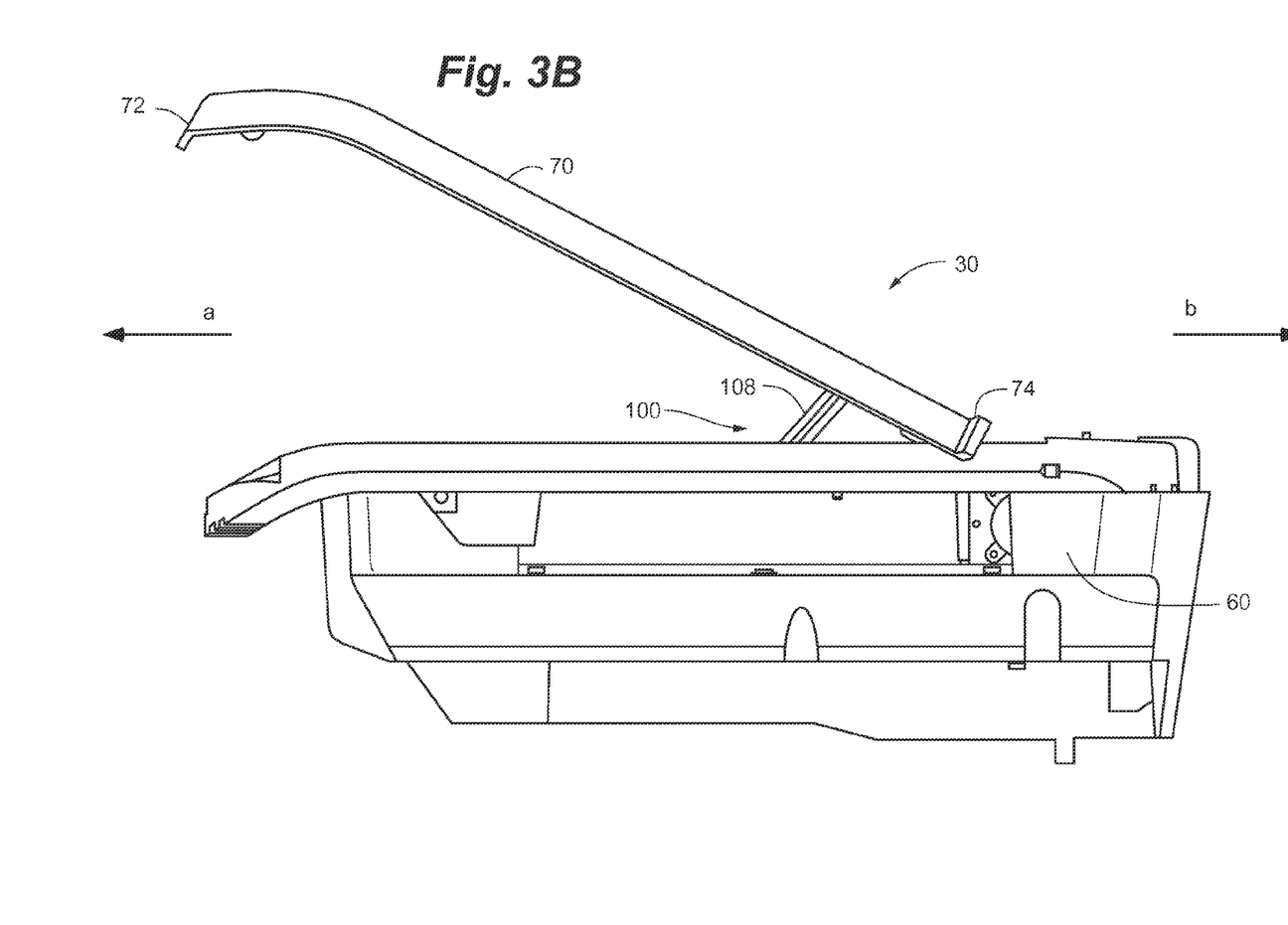
FIG. 3B is a side elevation view of an embodiment of an opening mechanism for a cart.
Figure 3C:
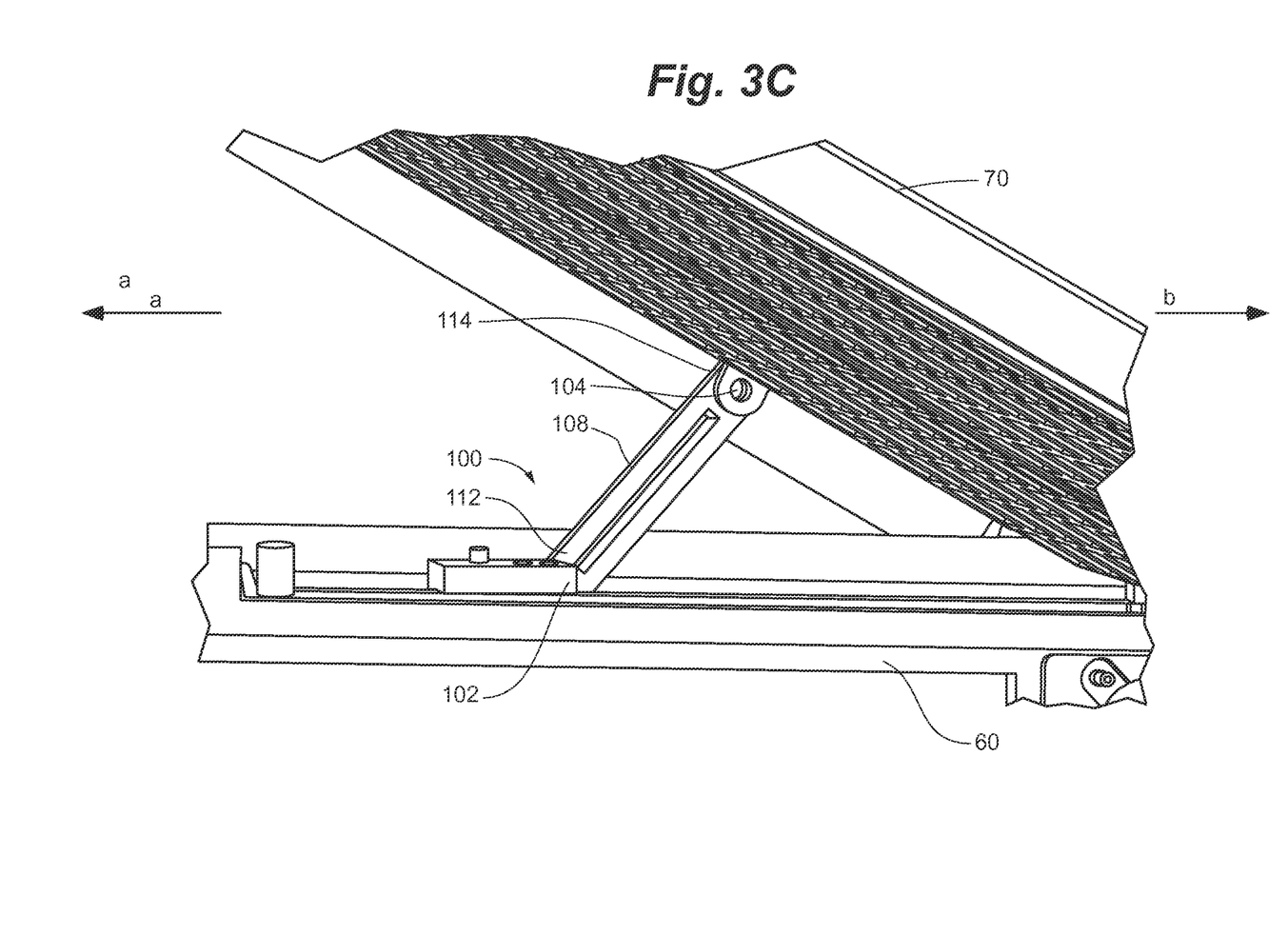
FIG. 3C is a close-up perspective view of a portion of the opening mechanism of FIG. 3B.

As shown in FIGS. 3A-C, in some embodiments, the work station 30 includes a compartment 60, a generally planar work surface 70 disposed above the compartment 60 and a first opening mechanism 100 coupled to the work surface 70. The compartment 60 can be useful for storing and/or charging one or more electronic devices. In some embodiments, the cart 10 can include a storage space 62 positioned in the compartment 60 adapted to support an electronic device. The storage space 62 can be enclosed by walls of the compartment 60. The top surface of the storage space 62 can be the work surface 70.

The work surface 70 can include a first edge 72 and a second edge 74 opposite to the first edge 72. The work surface 70 can be substantially rigid between the first edge 72 and the second edge 74. The work surface 70 can be moveable between an open position to provide access to the compartment 60 and a closed position to deny access to the compartment 60. In some embodiments, the second edge 74 of the work surface 70 contacts a stationary work surface 76 when the work surface 70 is in a closed position. In such embodiments, the stationary work surface 76 can be adapted to support an electronic display 600 as described further below.

In some embodiments, one or more electronic devices can be secured in the compartment 60 (e.g., in a storage space 62) by moving the work surface 70 to the closed position and, e.g., using a latch, key lock, or similar device to secure the compartment 60. For accessing the contents of the compartment 60, at least the first edge 72 of the work surface 70 can be lifted to expose the compartment 60 and its content. In some embodiments, a key can be used for unlatching (e.g., unlocking) and lifting the work surface.

The first opening mechanism 100 can be adapted to move the work surface 70 between the open position and the closed position. In some embodiments, the first opening mechanism 100 can be adapted to concurrently translate and rotate the work surface 70 such that the second edge 74 pivots about a pivot axis, the second edge 74 translates in a generally horizontal plane across the top of the side walls of the compartment (e.g., towards and away from a user positioned toward a front of the cart), and the first edge 72 of the work surface 70 moves in an arcuate path, with the center of the arcuate path pivoted about the second edge 74.

Figure 3D:
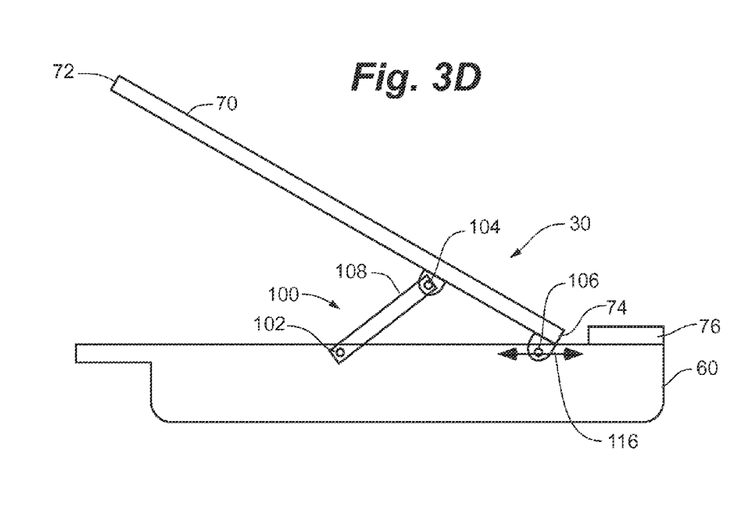
FIG. 3D is a side schematic view of an embodiment of an opening mechanism with the work surface in a partially open position.
Figure 3E:
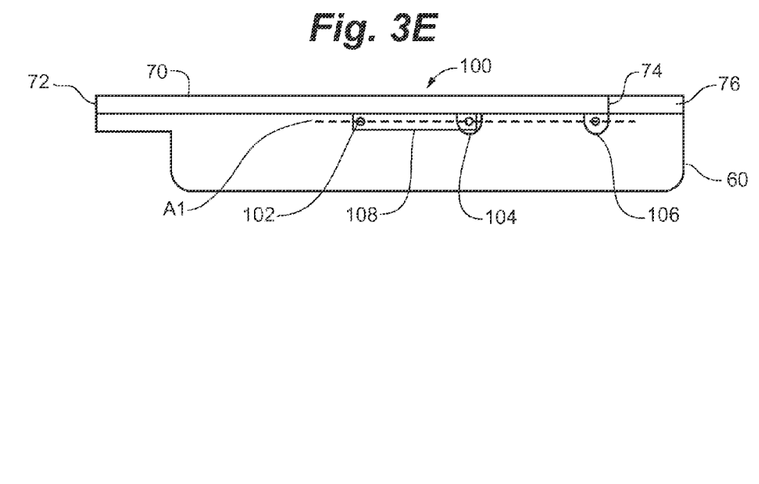
FIG. 3E is a side schematic view of the embodiment of the opening mechanism shown in FIG. 3D with the work surface in a closed position.

As shown in FIGS. 3C-E, in some embodiments, the first opening mechanism 100 includes a first hinge 102, a second hinge 104, a third hinge 106, and a linkage bar 108. At least one of the first hinge 102 and second hinge 104 is fixedly connectable to at least a portion of the compartment 60. The third hinge 106 can slidably engage with at least a portion of the compartment 60. The linkage bar 108 can be operably coupled to the compartment 60 and the work surface 70 by at least one of the first hinge 102 and the second hinge 104. In some embodiments, two or more of the first hinge 102, the second hinge 104, and the third hinge 106 are substantially aligned along a first axis "A1" when the work surface 70 is in a closed position (as depicted in FIG. 3E). In some embodiments, the linkage bar 108 includes a first end 112 and a second end 114. The first end 112 can be rotatably attached to the compartment proximate the first hinge 102. The second end 114 of the linkage bar 108 can be connected to an inside portion of the work surface 70 proximate the second hinge 104.

In some embodiments, at least one of the first hinge 102 and second hinge 104 is adapted to rotatably move the work surface 70, and the third hinge 106 is adapted to concurrently slidably move the work surface 70. The first opening mechanism 100 can be useful for translating the work surface 70 away from a rear of the work station proximate the second edge 74 of the work surface 70 and rotating the work surface 70 to provide access to the compartment 60. Such an embodiment allows the work surface 70 to translate forward in a sliding motion to avoid objects (e.g., an electronic display 600) positioned above and/or behind the work surface 70, while simultaneously pivoting upward.

The first opening mechanism 100 can include a slider 116 operably engaged with the third hinge 106. The slider 116 can be adapted to movably position the third hinge 106 along a translational axis. Such a slider 116 can be adapted to slidingly engage with a rail 118 or a slot (not shown) within the compartment 60.

Figure 4A:
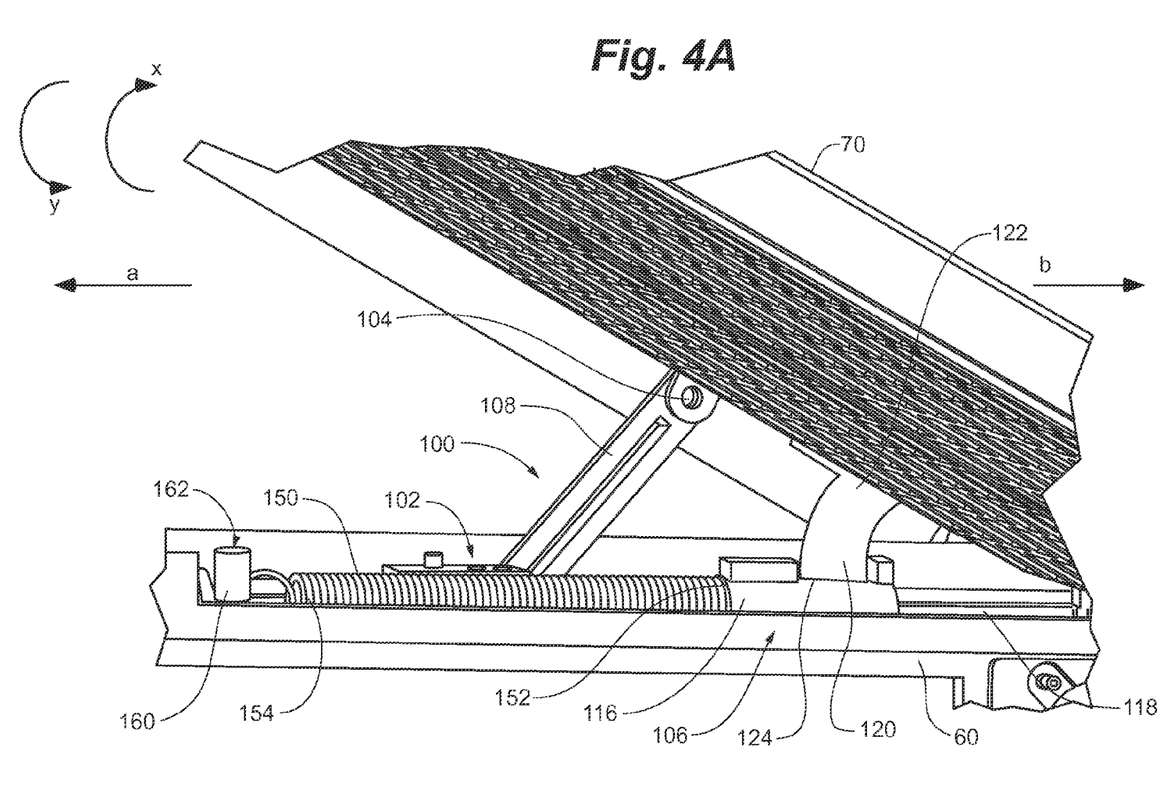
FIG. 4A is a close-up perspective view of a second embodiment of an opening mechanism with the work surface in a partially open position.

In some embodiments, the third hinge 106 is positioned proximate the second edge 74. In other embodiments, as shown in FIG. 4A, the third hinge is adapted to be positioned at a location spaced a distance from the second edge 74. In such embodiments, the sliding engagement of the bracket 120 with the slider 116 can allow the third hinge 106 to be positioned closer to the first hinge 102, or at other suitable locations (e.g., closer to the first edge 72 of the work surface 70 and away from the second edge 74 of the work surface 70).

In certain embodiments, the third hinge can include a bracket 120 slidingly engageable with the slider 116. The bracket 120 can be a curved plate or a longitudinally extending bar having at least a first end 122 fixedly and/or rotatably coupled to the work surface 70. The second end 124 of the bracket can be slidably received and extend through a slot in the slider 116 configured for facilitating slidable movement of the bracket through the slider 116. In this example, the curve of the bracket allows the third hinge to be based a distance from second edge 74 yet project the axis of pivotable rotation proximate second edge 74. In the embodiment shown in FIGS. 4B-E, the third hinge 106 does not include the bracket 120. In such embodiments, the third hinge 106 can be directly coupled to the slider 116 proximate the second edge.

In some embodiments, the bracket 120 can include a slot (not shown). In a non-limiting exemplary embodiment, a pin or a stud (not shown) can extend through the slot. The pin or stud can be operatively coupled to the slider 116. When the first edge 72 of the work surface 70 moves away from or towards along direction "x" or "y", concurrent movements are introduced in the slider 116 of the third hinge 106 and in the bracket 120 relative to the slider 116. The slider 116 can slidingly pull the bracket 120 along a direction "a" or "b". As a result the second edge 74 of the work surface 70 can move along a direction "a" or "b".

In an exemplary embodiment, when the first edge 72 of the work surface 70 moves along an arcuate path "x", the slider 116 (or the third hinge 106) can move in a direction "a" and pull the bracket 120 towards the direction "a". The work surface 70 can induce a sliding movement of the bracket 120 relative to the slider 116, and the movement of the bracket 120 can cause the second edge 74 of the work surface 70 to move. When the first edge 72 of the work surface 70 moves along an arcuate path "y", the slider 116 of the third hinge 106 moves along a direction "b", and can pull the bracket 120 and the second edge 74 of the work surface 70 along with it.

In certain embodiments, the opening mechanism 100 includes a spring (e.g., an extension or compression spring) to provide a lift assisting force and/or counterbalance to the weight of the work surface. In the embodiment shown in FIGS. 4A-E, the first opening mechanism 100 includes at least one extension spring 150. The extension spring 150 includes a first end 152 and a second end 154. As shown, the spring can be positioned between the third hinge and a front of the work station. The first end 152 of the extension spring 150 can be coupled to the third hinge 106. The extension spring 150 provides a first spring force "F1" (as depicted in FIGS. 4D-E) adapted to move the work surface 70 from the closed position to the open position. In some embodiments, two or more of the first hinge 102, second hinge 104, and third hinge 106 are substantially aligned along the first axis "A1". The first axis "A1" can be offset from a line of action "L1" of the first spring force "F1".

In some embodiments, at least one of the first spring force "F1" and a frictional force is adapted to movably position the work surface 70 at a first elevation within a range of elevations. In such embodiments, the extension spring 150 can be useful for maintaining the work surface 70 at a discrete elevated position, such as the fully open position. In some embodiments, the first opening mechanism 100 can include a work surface positional locking system to lock the position of the work surface in place at one or a plurality of discrete positions above the fully down position, such as one or more detents (not shown).

In some embodiments, the first opening mechanism 100 can include a first fixing device 160 adapted to secure the extension spring 150. The first fixing device 160 can be positioned on an interior surface of the compartment 60. The first fixing device 160 can be fixedly connectable to the second end 154 of the extension spring 150. In some embodiments, the first fixing device 160 is one of a fixed bracket, stud, protrusion, and head 162. Such embodiments can be useful for preventing accidental dislodgment of the extension spring 150 from the first fixing device 160.

Figure 4B:
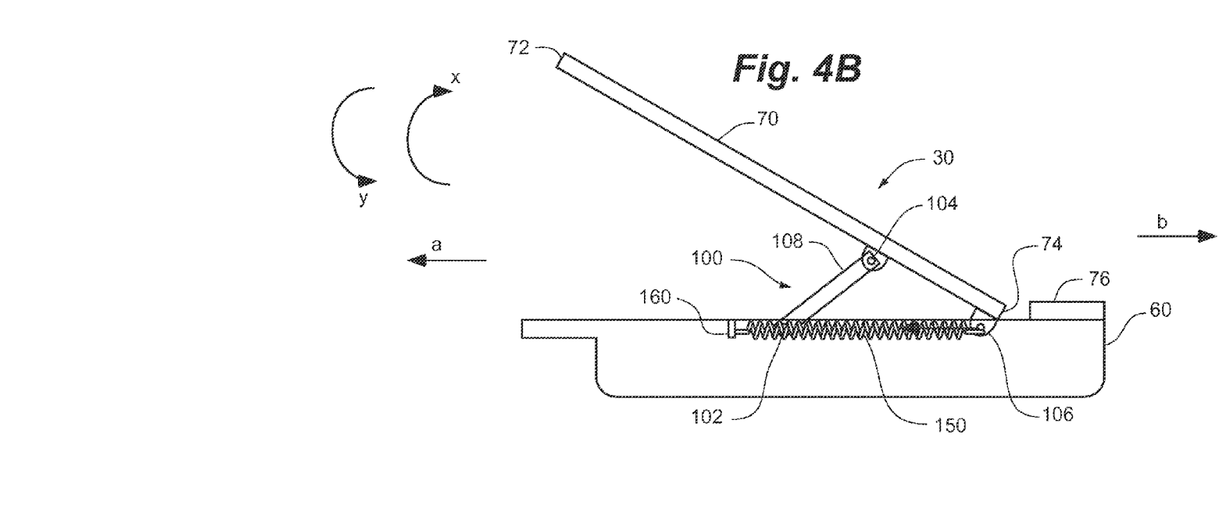
FIG. 4B is a side schematic view of the second embodiment of the opening mechanism with the work surface in a partially open position.
Figure 4C:
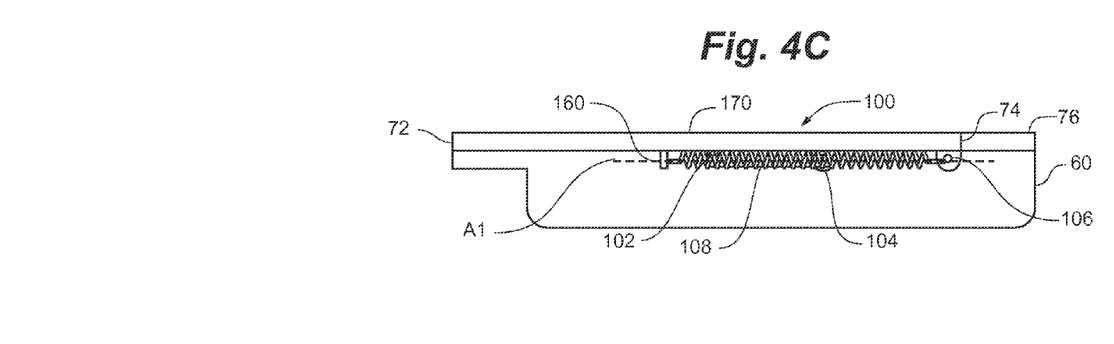
FIG. 4C is a side schematic view of the second embodiment of the opening mechanism with the work surface in a closed position.
Figure 4D:
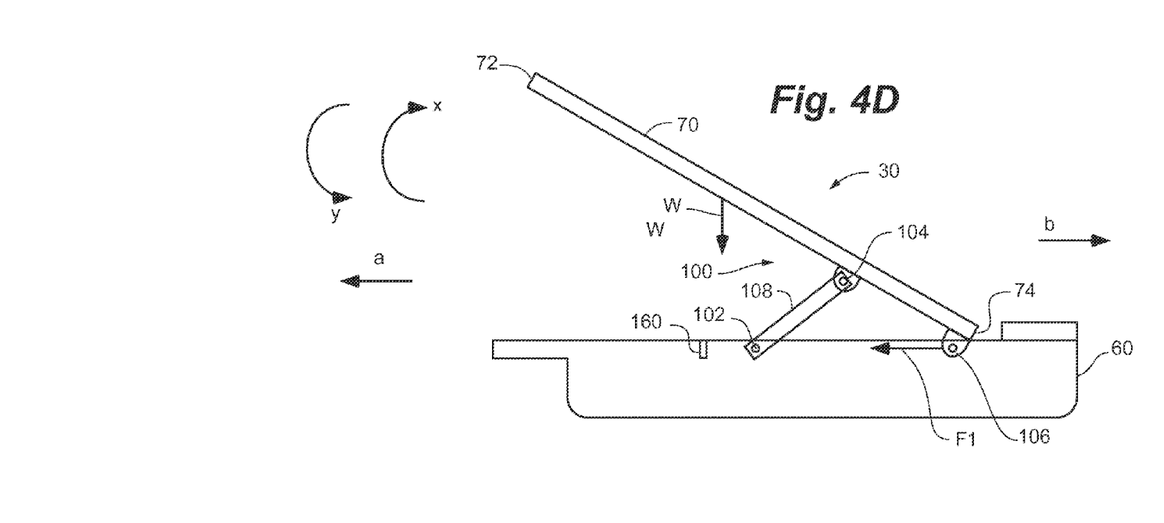
FIG. 4D is a side schematic view of the second embodiment of the opening mechanism with the work surface in a partially open position.
Figure 4E:
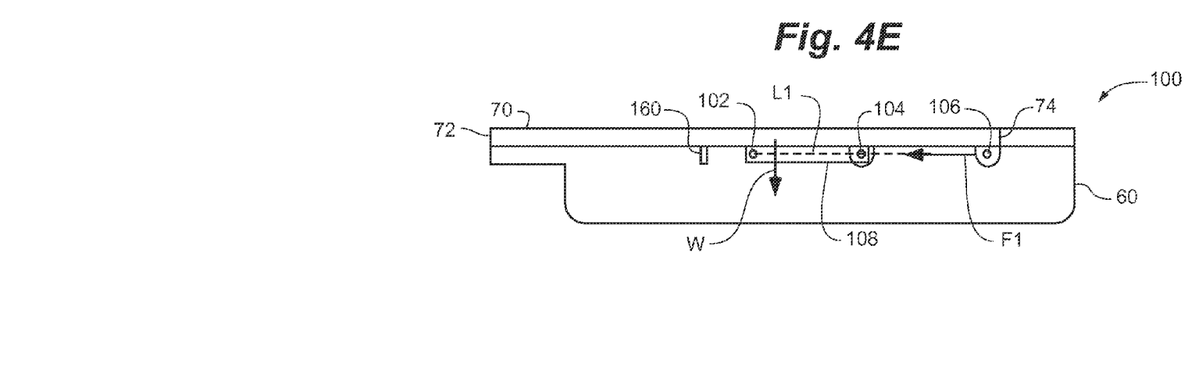
FIG. 4E is a side schematic view of the second embodiment of the opening mechanism with the work surface in a closed position.

With continued reference to FIGS. 4A-4C, the translational movement of the second edge 74 of the work surface 70 (and the slider 116 and/or third hinge 106) along the direction "b" can stretch the extension spring 150 and store a first spring force "F1" therein, and the translational movement of the second edge 74 of the work surface 70 along the direction "a" can release the first spring force "F1" stored in the extension spring 150. The direction "a" can be a forward direction with respect to the front edge, and the direction "b" can be a backward direction. Referring now to FIGS. 4B-4E, when the work surface 70 is in the closed position, the extension spring 150 is stretchable and stores the first spring force "F1". The extension spring 150 can exert the first spring force "F1" on the slider 116 and the third hinge 106 in the forward direction (e.g., towards the front of the compartment 60). The first spring force exerted on the slider 116 and the third hinge 106 can be useful for moving the first edge 72 along an arcuate direction "x", resulting in opening the compartment 60. The first spring force can reduce the total force required to open the compartment 60. The total force required to open the compartment 60 can be less when an extension spring such as that described elsewhere herein is included, than without an extension spring. In such a manner, the extension spring 150 can assist in translational movement of the third hinge 106. The extension spring 150 can also be useful for maintaining the work surface 70 at an elevated or a fully open position.

In some embodiments, the first spring force "F1" and frictional forces can movably position the work surface 70 at a first elevation within a range of elevations above the fully down position. An appropriate balance between the weight of the work surface 70, a first spring constant of the extension spring 150, and friction within the system can reduce or minimize the force required to movably position the work surface 70 at various elevations over a range of elevations. In some non-limiting exemplary embodiments, the weight "W" of the work surface 70 and the first spring force "F1" can act such that when the work surface 70 moves to the closed position it can remain in the closed position. In other embodiments, the weight "W" of the work surface 70 and the first spring force "F1" can act such that when the work surface 70 moves towards the closed position the work surface 70 can remain slightly ajar, rather than being closed completely (e.g., enclosing the compartment 60 to deny access). Such embodiments can be useful for permitting the first edge 72 of the work surface 70 to "pop open" to the slightly ajar position when it is opened. In such embodiments, the work surface 70 can be held down against the compartment 60 when closing and/or locking the compartment 60.

In other embodiments, as depicted in FIGS. 5A-D, the first opening mechanism 100 can include at least one compression spring 170. The compression spring 170 can include a first end 172 and a second end 174. As shown, the spring can be positioned between the third hinge and a rear of the work station. The first end 172 of the compression spring 170 can be fixedly connectable to the third hinge 106. The second end 174 of the compression spring 170 can be fixedly connectable to a second fixing device 180 similar to the first fixing device 160. The compression spring 170 can be adapted to provide a second spring force "F2" for moving the work surface 70 from the open position to the closed position.

Figure 5A:
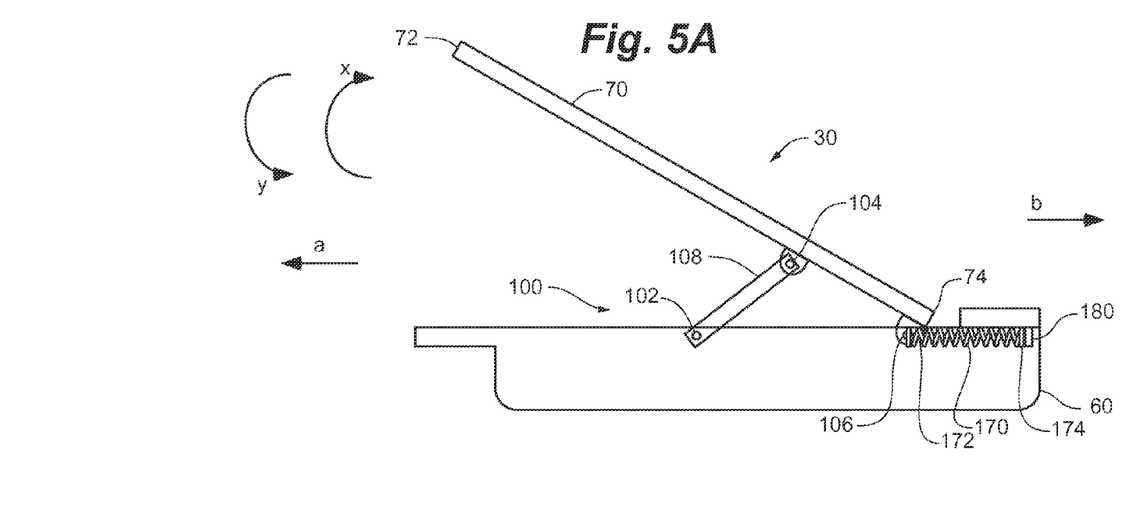
FIG. 5A is a side schematic view of a third embodiment of an opening mechanism with a work surface in a partially open position.
Figure 5B:
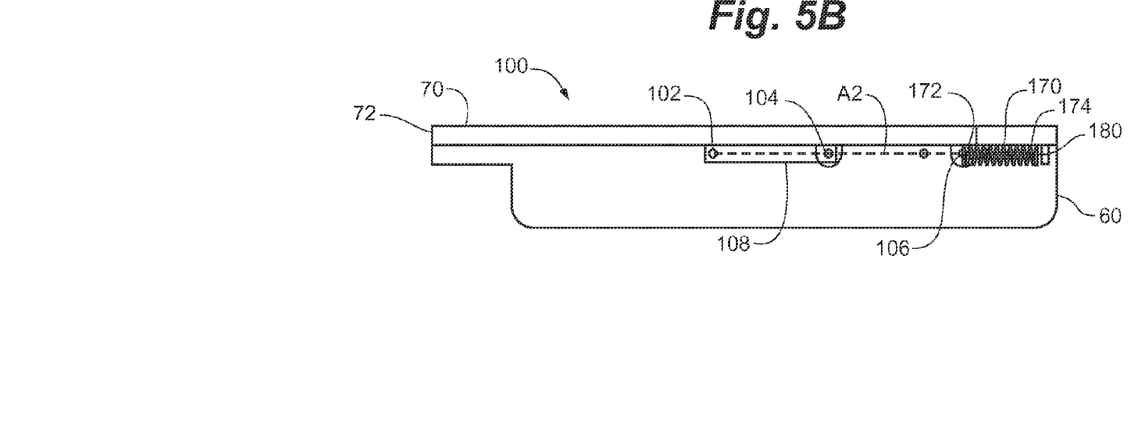
FIG. 5B is a side schematic view of the third embodiment of an opening mechanism with the work surface in a closed position.
Figure 5C:
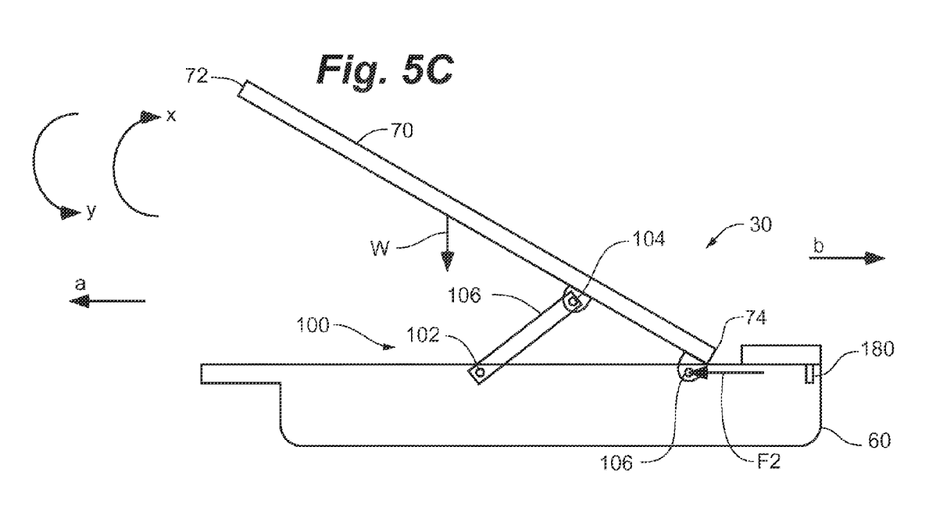
FIG. 5C is a side schematic view of the third embodiment of the opening mechanism with the work surface in a partially open position.
Figure 5D:
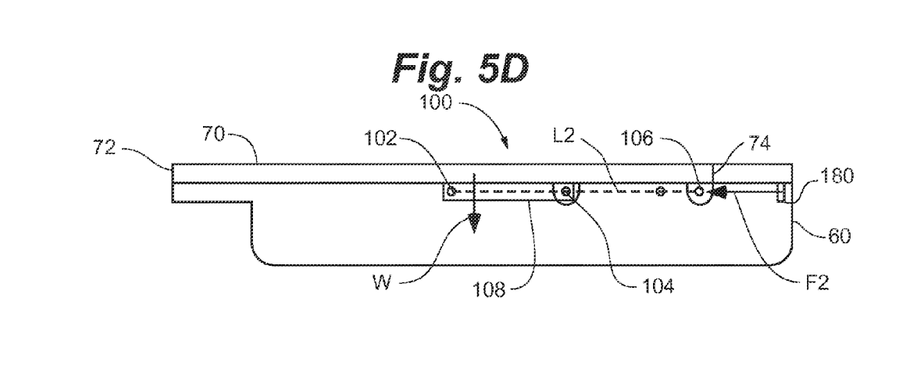
FIG. 5D is a side schematic view of the third embodiment of the opening mechanism with the work surface in a closed position.

Referring now to FIGS. 5A and 5B, the translational movement of the second edge 74 of the work surface 70 (and the slider 116 and/or the third hinge 106) along the direction "a" can expand the compression spring 170 and release a second spring force "F2" in the compression spring 170. The translational movement of the second edge 74 of the work surface 70 along the direction "b" can create the second spring force "F2" in the compression spring 170. Referring now to FIGS. 5C and 5D, when the work surface 70 is in the open position, the compression spring 170 can exert the second spring force "F2" on the slider 116 and/or the third hinge 106 along the direction "a." In such embodiments, the second spring force "F2" exerted by the compression spring 170 on the slider 116 and/or the third hinge 106 along the direction "a" can be useful for moving the work surface 70 from the closed position to the open position. The compression spring 170 can reduce the total force required to open the compartment 60. The total force required to open the compartment 60 can be less when a compression spring such as that described elsewhere herein is included, than without a compression spring. The second spring force "F2" stored in the compression spring 170 and exerted along direction "a" on the third hinge 106 along a line of action "L2" assists the translational movement of the third hinge 106 along direction "a". The compression spring 170 can also be useful for maintaining the work surface 70 at an elevated or fully open position.

In some embodiments, the second spring force "F2" and frictional forces can be useful for maintaining the work surface 70 at any elevated position within the range of travel of the work surface 70 and/or the linkage bar 108. In some embodiments, two or more of the first hinge 102, the second hinge 104 and the third hinge 106 are substantially aligned along a second axis "A2". The second axis "A2" can be offset from the line of action "L2" of the second spring force "F2". In some embodiments, at least one of the second spring force "F2" and a frictional force is adapted to movably position the work surface 70 at a second elevation within a range of elevations above the fully down position.

As best seen in FIG. 3A, the cart 10 can include a second opening mechanism 200 coupled to the work surface 70. The second opening mechanism can include any embodiment of opening mechanism described herein. In such embodiments, the first opening mechanism 100 can be positioned on a first wall 64 of the compartment 60 and the second opening mechanism 200 can be positioned on a second wall 66 of the compartment 60. While the side elevation views illustrated in the figures show the first opening mechanism 100 on one side of the compartment 60, it should be realized that the second opening mechanism 200 can be provided on the opposite side of the compartment 60.

In some embodiments, the work station can include various other features. In some embodiments, the work station includes a locking mechanism 300, as depicted in FIG. 3A, adapted to lock the compartment 60. Such an embodiment is useful for securing the contents of the compartment 60. A key lock or a similar device can be included with the locking mechanism. In a non-limiting exemplary embodiment, the locking mechanism 300 can be semi-automatic, and can be locked by merely pressing the work surface 70 in a downwardly direction. In certain embodiments having a spring configured to raise the work surface above its fully down position, the lock can function as a latch to secure the work surface to the work platform at is fully down position.

The cart 10 can assume a variety of configurations. Referring back to FIGS. 1-2, the cart 10 can also include a keyboard tray 400 located below the compartment 60. The keyboard tray 400 can support a keyboard 500. In some embodiments, the horizontal position of the keyboard can be adjusted with respect to the work station.

The cart may also include electronic circuitry for charging an electronic device placed in the compartment, such as a charging station (not shown) supported by the work station 30. The charging station can be adapted to provide electrical power to at least one electronic device. Other electrical and connections may also be provided.

With continued references to FIGS. 1-2, an electronic display 600 (e.g., monitor) and/or a display mount 700 (e.g., VESA mount) that can be coupled to an electronic display 600 can be positioned above the work surface 70. In some embodiments, an electronic display mount 700 can be positioned above the work surface 70 and proximate the second edge 74. As shown in FIG. 2, a riser 800, such as a height adjustable support column or an articulating arm, can optionally be provided to support the display mount above the work surface. In some embodiments, a portion of work surface is resected around the riser such that the riser does not interfere with the opening and the closing of the work surface. In other embodiments, second edge 74 abuts a portion of a stationary work surface 76 that remains stationary during work surface opening and closing operations, and the riser is supported by the stationary work surface.

Embodiments of the invention also include methods of using a cart 10 described herein. Methods in accordance with embodiments of the invention can include one or more of the following steps of providing a cart 10; moving a work surface 70 of the cart 10 with the assistance of at least one first opening mechanism 100 from a closed position to an open position to provide access to a compartment 60; securing and/or charging one or more electronic devices in the compartment 60; moving the work surface 70 of the cart 10 from the open position to the closed position; locking the movement of the work surface 70 and using a locking mechanism. The method of using the cart 10 can also involve unlocking the movement of the work surface 70; moving the work surface 70 from the closed position to the open position; obtaining access to one or more electronic devices secured and/or charged in the compartment 60.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

What is claimed is:

1. A cart, comprising:
   a base; and
   a work station supported by the base, the work station including:
      a compartment,
      a generally planar work surface disposed above the compartment, the work surface including a first edge and a second edge opposite to the first edge, the work surface being substantially rigid between the first edge and the second edge and moveable between an open position to provide access to the compartment and a closed position to deny access to the compartment, and
      a first opening mechanism coupled to the work surface, the opening mechanism adapted to concurrently translate and rotate the work surface such that:
      the second edge pivots about a pivot axis;
      the second edge translates in a generally horizontal plane; and
      the first edge of the work surface moves upward in an arcuate path, with the center of the arcuate path pivoted about the second edge, such that the generally planar work surface remains generally disposed above the compartment.

2. The cart of claim 1, wherein the first opening mechanism includes a first hinge, a second hinge, a third hinge, and a linkage bar, wherein
   at least one of the first hinge and second hinge is fixedly connectable to at least a portion of the compartment,
   the third hinge slidably engages with at least a portion of the compartment, and
   the linkage bar is operably coupled to the compartment and the work surface by at least one of the first hinge and the second hinge.

3. The cart of claim 2, wherein the linkage bar includes a first end and a second end, the first end rotatably attached to the first hinge.

4. The cart of claim 3, wherein the second hinge rotatably connects the second end of the linkage bar to an inside portion of the work surface.

5. The cart of claim 2, wherein at least one of the first hinge and the second hinge is fixedly connectable to the work surface.

6. The cart of claim 2, wherein the opening mechanism includes a slider operably engaged with the third hinge, the slider adapted to movably position the third hinge along a translational axis.

7. The cart of claim 6, wherein the slider includes a slot adapted to receive a bracket, the bracket having a first end and a second end, wherein
   the bracket is in sliding engagement with the slot of the slider, and
   the bracket engages with at least a portion of the work surface.

8. The cart of claim 2, wherein the first hinge, the second hinge, and the third hinge are substantially aligned along a first axis when the work surface is in a closed position.

9. The cart of claim 2, wherein the opening mechanism includes at least one extension spring, the extension spring including a first end and a second end, the first end of the extension spring coupled to the third hinge and the second end fixed to the compartment, and the extension spring providing a first spring force adapted to move the work surface from the closed position to the open position.

10. The cart of claim 9, wherein the first hinge and the second hinge are substantially aligned along a first axis, the first axis being offset from a line of action of the first spring force.

11. The cart of claim 9, wherein at least one of the first spring force and a frictional force is adapted to movably position the work surface at a first elevation within a range of elevations above a fully down position.

12. The cart of claim 9, further comprising a fixing device, the fixing device positioned on an interior surface of the compartment, the fixing device fixedly connectable to the second end of the extension spring.

13. The cart of claim 12, wherein the fixing device is one of a fixed bracket, stud, protrusion, and stopper.

14. The cart of claim 2, wherein the opening mechanism includes at least one compression spring,
the compression spring including a first end and a second end,
the first end of the compression spring fixedly connected to the third hinge and
the second end of the compression spring fixedly connected to the compartment, and
the compression spring adapted to provide a second spring force for moving the work surface from the closed position to the open position.

15. The cart of claim 14, wherein the first hinge and the second hinge are substantially aligned along a second axis, the second axis being offset from a line of action of the second spring force.

16. The cart of claim 14, wherein at least one of the second spring force and a frictional force is adapted to movably position the work surface at a second elevation within a range of elevations above a fully down position.

17. The cart of claim 1, further comprising a second opening mechanism coupled to the work surface, the first opening mechanism being positioned on a first wall of the compartment and the second opening mechanism being positioned on a second wall of the compartment.

18. The cart of claim 1, further comprising a locking mechanism, the locking mechanism adapted to lock the compartment when the work surface is in the closed position.

19. The cart of claim 1, wherein the second edge of the work surface contacts a stationary work surface when the work surface is in a closed position.

20. The cart of claim 1, further comprising at least one of
a keyboard tray adapted to support a keyboard, the keyboard tray located below the compartment,
a surface positioned in the storage space, the surface adapted to support a notebook computer, a desktop computer, a tablet device, and
an electronic display positioned above the work surface.

21. The cart of claim 1, wherein the cart is a computing cart.

22. The cart of claim 1, wherein the cart is a charging cart.

23. The cart of claim 1, wherein the work station is supported by a riser extending vertically from the base.

24. The cart of claim 1, wherein the work station is height adjustable with respect to the base.

25. The cart of claim 1, further including an electronic display mount positioned above the work surface and proximate the second edge.

26. The cart of claim 25, further including a riser supported by the work station to position the electronic display mount above the work surface.

27. The cart of claim 1, further comprising a plurality of casters supported by the base.

28. An opening mechanism for a work station, the opening mechanism comprising:
a compartment enclosed by a generally planar work surface;
a first hinge coupled to at least a portion of the compartment;
a second hinge coupled to at least a portion of the work surface;
a third hinge slidably engaging with at least a portion of the compartment; and
a linkage bar rotatably coupled to the compartment and the work surface by at least one of the first hinge and the second hinge, wherein,
at least one of the first hinge and second hinge is adapted to rotatably move the work surface, and the third hinge is adapted to concurrently slidably move the work surface.

29. A cart, comprising:
a base; and
a work station supported by the base, the work station including:
a compartment,
a generally planar work surface disposed above the compartment, the work surface including a first edge and a second edge opposite to the first edge, the work surface being substantially rigid between the first edge and the second edge and moveable between an open position to provide access to the compartment and a closed position to deny access to the compartment, and
a first opening mechanism coupled to the work surface, the first opening mechanism including a first hinge, a second hinge, a third hinge, and a linkage bar,
wherein at least one of the first hinge and second hinge is fixedly connectable to at least a portion of the compartment,
wherein the third hinge slidably engages with at least a portion of the compartment,
wherein the linkage bar is operably coupled to the compartment and the work surface by at least one of the first hinge and the second hinge, and
wherein the opening mechanism is adapted to concurrently translate and rotate the work surface such that:
the second edge pivots about a pivot axis;
the second edge translates in a generally horizontal plane; and
the first edge of the work surface moves upward in an arcuate path, with the center of the arcuate path pivoted about the second edge.

* * * * *

UNITED STATES PATENT AND TRADEMARK OFFICE
CERTIFICATE OF CORRECTION

PATENT NO. : 9,027,940 B2
APPLICATION NO. : 14/037605
DATED : May 12, 2015
INVENTOR(S) : Ergun et al.

Page 1 of 1

It is certified that error appears in the above-identified patent and that said Letters Patent is hereby corrected as shown below:

In the Specification

In column 2, line 14, after "in", delete "¶", therefor

In the Claims

In column 9, line 26, in Claim 14, after "hinge", insert --,--, therefor

Signed and Sealed this
Twentieth Day of October, 2015

Michelle K. Lee
*Director of the United States Patent and Trademark Office*